United States Patent
Sakurai et al.

(10) Patent No.: US 7,580,223 B2
(45) Date of Patent: Aug. 25, 2009

(54) MAGNETIC RECORDING MEDIA, SUBSTRATE FOR MAGNETIC RECORDING MEDIA, AND MAGNETIC RECORDING APPARATUS

(75) Inventors: Masatoshi Sakurai, Tokyo (JP); Akira Kikitsu, Yokohama (JP); Masahiro Oka, Ichihara (JP)

(73) Assignees: Kabushiki Kaisha Toshiba, Tokyo (JP); Showa Denko K.K., Tokyo (JP)

( * ) Notice: Subject to any disclaimer, the term of this patent is extended or adjusted under 35 U.S.C. 154(b) by 254 days.

(21) Appl. No.: 11/475,874

(22) Filed: Jun. 28, 2006

(65) Prior Publication Data

US 2007/0003793 A1 Jan. 4, 2007

(30) Foreign Application Priority Data

Jun. 28, 2005 (JP) ............................. 2005-188386

(51) Int. Cl.
*G11B 5/82* (2006.01)
(52) U.S. Cl. .................. 360/135; 360/15; 428/826; 428/848.1
(58) Field of Classification Search ........................ None
See application file for complete search history.

(56) References Cited

U.S. PATENT DOCUMENTS

| 3,627,330 | A | * | 12/1971 | Dimitracopoulos | ......... 360/131 |
| 5,402,278 | A | | 3/1995 | Morita | |
| 5,535,069 | A | * | 7/1996 | Chiao et al. | .............. 360/77.03 |
| 6,254,966 | B1 | * | 7/2001 | Kondo | ......................... 428/156 |
| 6,331,364 | B1 | | 12/2001 | Baglin et al. | |
| 2002/0182443 | A1 | | 12/2002 | Ohkubo | |
| 2004/0257687 | A1 | * | 12/2004 | Ishida et al. | .................. 360/17 |
| 2005/0117253 | A1 | * | 6/2005 | Moriya et al. | ............... 360/135 |
| 2006/0014053 | A1 | * | 1/2006 | Asakura et al. | .......... 428/848.1 |
| 2007/0190365 | A1 | * | 8/2007 | Kodama et al. | ............. 428/832 |

FOREIGN PATENT DOCUMENTS

| JP | 02-232816 | 9/1990 |
| JP | 06-076278 | 3/1994 |
| JP | 11-273059 A | 10/1999 |
| JP | 2000-211082 | 8/2000 |
| JP | 2001-273682 A | 10/2001 |
| JP | 3576220 B2 | 10/2004 |

OTHER PUBLICATIONS

Austrian Search Report dated Sep. 7, 2007.
Chinese Office Action dated Nov. 30, 2007 for Appln. No. 2006100942249.

* cited by examiner

*Primary Examiner*—Jason C Olson
(74) *Attorney, Agent, or Firm*—Pillsbury Winthrop Shaw Pittman, LLP

(57) ABSTRACT

According to one embodiment, a magnetic recording media includes a substrate having recording tracks and separating regions separating the recording tracks, the separating regions having patterns of protrusions and recesses formed therein, and a recording film deposited on the substrate, in which a difference in height between a top of the recording track and a top of the separating region is 2 nm or more and 7 nm or less, and a difference in height between the top of the recording track and a bottom of the separating region is 10 nm or more.

10 Claims, 2 Drawing Sheets

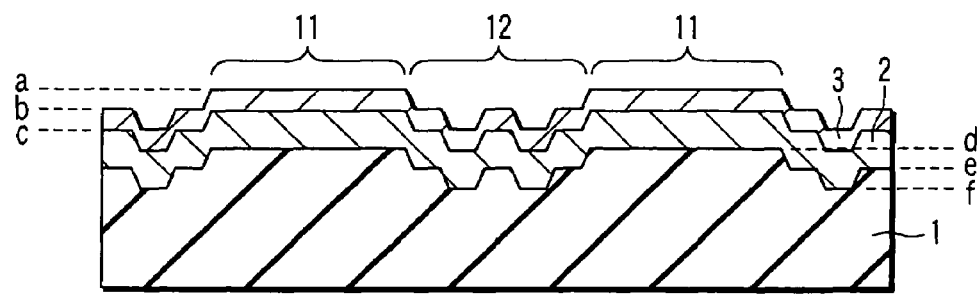
F I G. 1
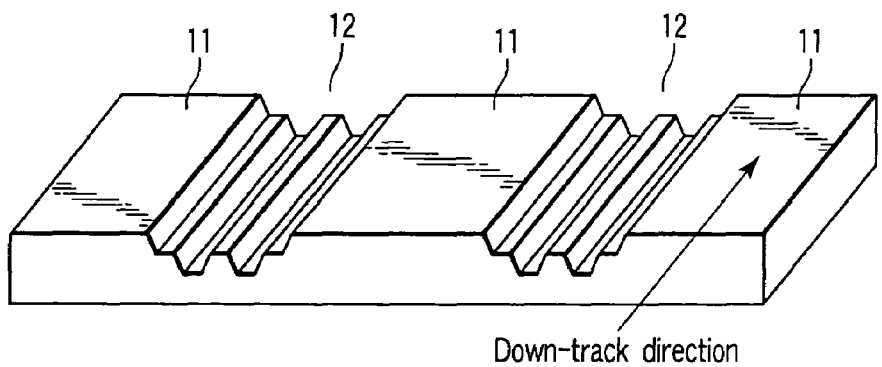
Down-track direction
F I G. 2
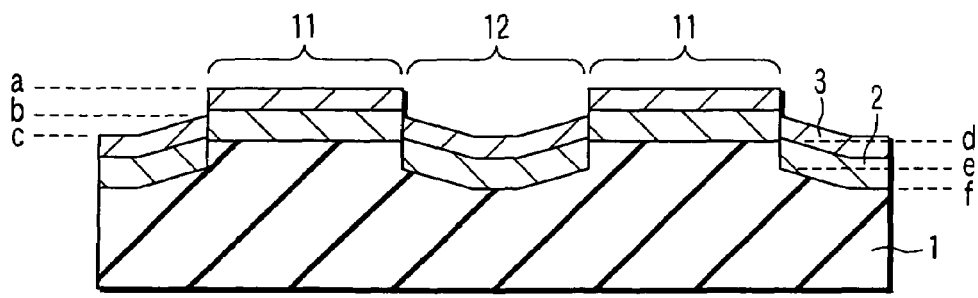
F I G. 3

Down-track direction

MAGNETIC RECORDING MEDIA, SUBSTRATE FOR MAGNETIC RECORDING MEDIA, AND MAGNETIC RECORDING APPARATUS

CROSS-REFERENCE TO RELATED APPLICATIONS

This application is based upon and claims the benefit of priority from Japanese Patent Application No. 2005-188386, filed Jun. 28, 2005, the entire contents of which are incorporated herein by reference.

BACKGROUND

1. Field

One embodiment of the present invention relates to a magnetic recording media having discrete tracks, a substrate used to manufacture the magnetic recording media, and a magnetic recording apparatus comprising the magnetic recording media.

2. Description of the Related Art

With an increase in the track density of hard disk drives (HDDs), interference between adjacent tracks has become more and more problematic. In particular, an important technical objective is to reduce write fringing caused by the fringe effect of a magnetic field from the write head. A discrete track type patterned media (a DTR media) with physically separated recording tracks can reduce a side erase phenomenon during data writing and a side read phenomenon during data reading, making it possible to greatly increase density in the cross-track direction. The discrete track type patterned media is thus expected to provide a magnetic recording media that can realize high-density recording.

The DTR media is roughly classified into a magnetic film etching type and a substrate etching type. The magnetic film etching type DTR media involves a large number of manufacturing steps and is expected to increase costs. In contrast, the substrate etching type DTR media, which is manufactured by first forming protrusions and recesses in the substrate and then depositing a magnetic film on the substrate by sputtering, is suitable for mass production.

However, because the magnetic film is also present in recesses in the substrate etching type DTR media, the signal-to-noise ratio may disadvantageously be degraded due to magnetic signals from the recesses.

A HDD media has been known in which protrusions and recesses are formed on a surface of a substrate and in which a magnetic film is deposited on the protrusions and recesses substrate (see U.S. Pat. No. 5,402,278). In the HDD media, data are recorded to the magnetic film on the protrusions located close to the head. The magnetic film on the recesses is located away from the head and is thus not subjected to magnetic recording. The magnetic film on the recesses also provides low read signals. The HDD media is intended to suppress the recording interference between adjacent tracks. However, with U.S. Pat. No. 5,402,278, the large depth of the recesses in the surface of the media makes it difficult to allow the read/write head to fly stably over the media having the protrusions and recesses.

On the other hand, a method has been proposed in which a magnetic multilayer film is deposited on a flat substrate surface and the magnetic multilayer film in the regions between tracks is irradiated with ion beams for destroying the structure (see U.S. Pat. No. 6,331,364). This method degrades the magnetic recording characteristics of the magnetic material between the tracks, which is not subjected to magnetic recording. The magnetic material between the tracks also provides weak read signals. This method is intended to suppress the recording interference between the adjacent tracks.

However, U.S. Pat. No. 6,331,364 essentially requires the ion-beam irradiation process after deposition of the magnetic film, leading to higher costs for manufacturing the media.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a sectional view of a magnetic recording media according to an embodiment of the present invention;

FIG. 2 is a perspective view showing an example of the surface structure of the magnetic recording media according to an embodiment of the present invention;

FIG. 3 is a sectional view of a magnetic recording media according to another embodiment of the present invention;

DETAILED DESCRIPTION

Figure 4:
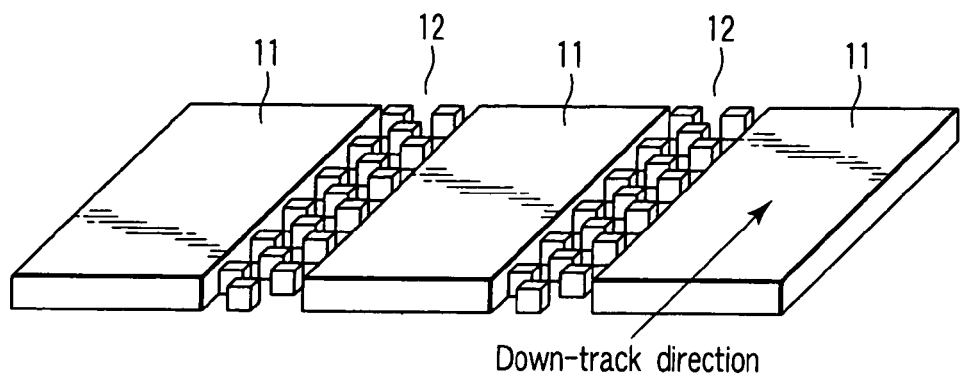
FIG. 4 is a perspective view showing another example of the surface structure of the magnetic recording media according to an embodiment of the present invention.

Various embodiments according to the invention will be described hereinafter with reference to the accompanying drawings. In general, according to one embodiment of the present invention, there is provided a magnetic recording media comprising: a substrate having recording tracks and separating regions separating the recording tracks, the separating regions having patterns of protrusions and recesses formed therein; and a recording film deposited on the substrate, wherein a difference in height between a top of the recording track and a top of the separating region is 2 nm or more and 7 nm or less, and a difference in height between the top of the recording track and a bottom of the separating region is 10 nm or more.

A magnetic recording media according to an embodiment of the present invention has a diameter of 65 mm and a track pitch of 200 nm. However, the effects of the present invention are not limited to the media specification. The magnetic recording media according to an embodiment of the present invention comprises a substrate having recording tracks and separating regions separating the recording track, the separating regions having patterns of protrusions and recesses formed therein. The magnetic recording media further comprises a recording film (a multilayer including a soft underlayer and a perpendicular magnetic recording layer) deposited on the substrate. The recording film deposited on the flat recording tracks exhibits preferable recording/reproducing characteristics. On the other hand, the recording film deposited on the separating region between the recording tracks, in which the patterns of protrusions and recesses are formed, has disturbed crystal orientations of the recording film and thus degraded read/write characteristics. Further, appropriate values are set for the difference in height between the top of the recording track and the top of the separating region and for the difference in height between the top of the recording track and the bottom of the separating region. This prevents magnetic signals from the recesses from degrading the signal-to-noise ratio. In addition, this improves the flying characteristics of the read/write head.

FIG. 1 is a sectional view of a magnetic recording media according to an embodiment of the present invention. As shown in FIG. 1, a substrate 1 has recording tracks 11 and separating regions 12 separating the recording tracks 11. Patterns of protrusions and recesses are formed in the separating regions 12. A recording film is deposited on the substrate 1;

the recording film has a multilayer structure including a soft underlayer 2 and a perpendicular magnetic recording layer 3. The recording film has an orientation control layer and a protective layer in addition to the soft underlayer 2 and perpendicular magnetic recording layer 3.

In the magnetic recording media according to the embodiment of the present invention, the height of top of the recording layer of the recording track is denoted by a, the height of top of the recording layer of the separating region is denoted by b, and the height of bottom of the recording layer of the separating region is denoted by c. Then, the difference (a−b) in height between the top of the recording track and the top of the separating region and the difference (a−c) in height between the top of the recording track and the bottom of the separating region are set so as to meet the following relationship:

$$2 \text{ nm} \leq (a-b) \leq 7 \text{ nm, and } 10 \text{ nm} \leq (a-c).$$

Similarly, in the substrate, the height of top of the recording track is denoted by d, the height of top of the separating region is denoted by e, and the height of bottom of the separating region is denoted by f. Then, the difference (d−e) in height between the top of the recording track and the top of the separating region and the difference (d−f) in height between the top of the recording track and the bottom of the separating region are set so as to meet the following relationship:

$$2 \text{ nm} \leq (d-e) \leq 7 \text{ nm, and } 10 \text{ nm} \leq (d-f).$$

Each of the differences (a−c) and (d−f) in height between the top of the recording track and the top of the separating region is preferably less than 30 nm. The heights of each portion can be determined by, for example, using an atomic force microscope (AFM) to observe a cross section of the magnetic recording media.

FIG. 2 is a perspective view showing an example of the surface structure of the magnetic recording media according to the embodiment of the present invention shown in FIG. 1. In FIG. 2, the patterns of protrusions and recesses in the separating region form linear patterns extending along the recording track 11.

The groove structure in the separating region may be formed of a plurality of grooves as shown in FIG. 2 or a single groove as shown in FIG. 3. If the separating region has the single groove structure as shown in FIG. 3, the top of the separating region corresponds to that part of the sidewall shape at an end of the recording portion in which angle or curvature changes, in a sectional view taken across a line perpendicular to the tracks.

The patterns of protrusions and recesses in the separating region 12 is not limited to the linear patterns as shown in FIG. 2 but may be dot patterns as shown in FIG. 4. The linear or dot patterns of the separating region 12 are narrower or smaller than the protruded patterns constituting the recording tracks 11. Accordingly, although the recording film deposited on the separating region 12 is prone to have rounded top corners, it is sufficient that the patterns just satisfy the above height conditions.

Now, description will be given of a method for manufacturing a magnetic recording media according to an embodiment of the present invention. The manufacture method involves a process of producing a stamper, a process of producing a substrate having protrusions and recesses, a process of depositing a magnetic film, and a finishing process.

The process of producing a stamper will be described. The process of producing a stamper is divided into drawing, development, electroforming, and finishing.

A master is coated with a resist, which is set in an electron-beam exposure apparatus in which the master is supported rotatably. While the master is being rotated, those areas of the media surface which correspond to recesses are irradiated with the electron beam to draw patterns. This operation is continued from the inner periphery to the outer periphery of the master. Description will be given of formation of linear patterns in separating regions of width 60 nm as shown in FIG. 2; track pitch is set at 200 nm and the width of a magnetic film on the recording track is set at 140 nm. In this case, while the master is being rotated three turns, each separating region is irradiated with the electron beam with a spot diameter of 25 nm so that the edges of spots overlap. The area where spots of electron beam overlap is subjected to larger amount of exposure as a result of two times of exposures. Thus, development forms this area into a deep groove (bottom of the separating region). The area where spots of electron beam do not overlap is subjected to only one exposure. Thus, development forms this area into a shallow groove (top of the separating region).

The master is subjected to treatments such as development and RIE and is formed into a resist master having patterns of protrusions and recesses. The surface of the resist master is made conductive, and then electroforming is performed to deposit a Ni electroforming film, which is then peeled off. The Ni electroforming film peeled off is polished on the back surface for flattening treatment to adjust film thickness. The master is then punched to form a disk-like stamper made of Ni having predetermined inner and outer diameters. The stamper has protrusions corresponding to recesses on the media. The difference in height between the region corresponding to the recording track and the region corresponding to the separating region is adjusted on the basis of the film thickness of the resist and RIE conditions. The difference is 30 nm or more, preferably about 70 nm. This stamper is used to manufacture a discrete track type patterned media.

In the process of producing a substrate having protrusions and recesses, an imprint apparatus capable of transferring both sides simultaneously is used to transfer the patterns of protrusions and recesses to the HDD substrate by imprint lithography. First, the HDD substrate is coated with an imprint resist on both surfaces. The substrate is sandwiched with two stampers for the back and front surfaces, and pressed uniformly on the entire surface to transfer the patterns of protrusions and recesses to the resist surface. This transfer process forms recesses on the resist which correspond to the recesses on the media. Then, the substrate is etched using the resist having the patterns of protrusions and recesses as a mask. The etching method uses RIE based on a $CF_4$ gas in the case of, for example, a glass substrate but is not limited to this. The etching results in an HDD substrate with the patterns of protrusions and recesses formed on the surface thereof. After etching, the difference in height between the region corresponding to the recording track and the region corresponding area and separating region is 10 nm or more, preferably about 20 nm.

In the process of depositing a magnetic film, a recording film including a soft underlayer and a perpendicular magnetic recording layer is deposited on the surfaces of the glass substrate with the patterns of protrusions and recesses to manufacture a perpendicular magnetic recording media. The media having the perpendicular magnetic recording layer on the soft underlayer with high permeability is called a perpendicular double-layer media. In the perpendicular double-layer media, the soft underlayer (SUL) shares a part of the function of the head in which the soft underlayer allows a recording magnetic field from a single pole head to pass through in a horizontal direction to return to the return yoke arranged near the single pole head. That is, the soft underlayer serves to apply a steep, sufficient perpendicular magnetic field to the recording layer to improve recording efficiency.

Figure 5:
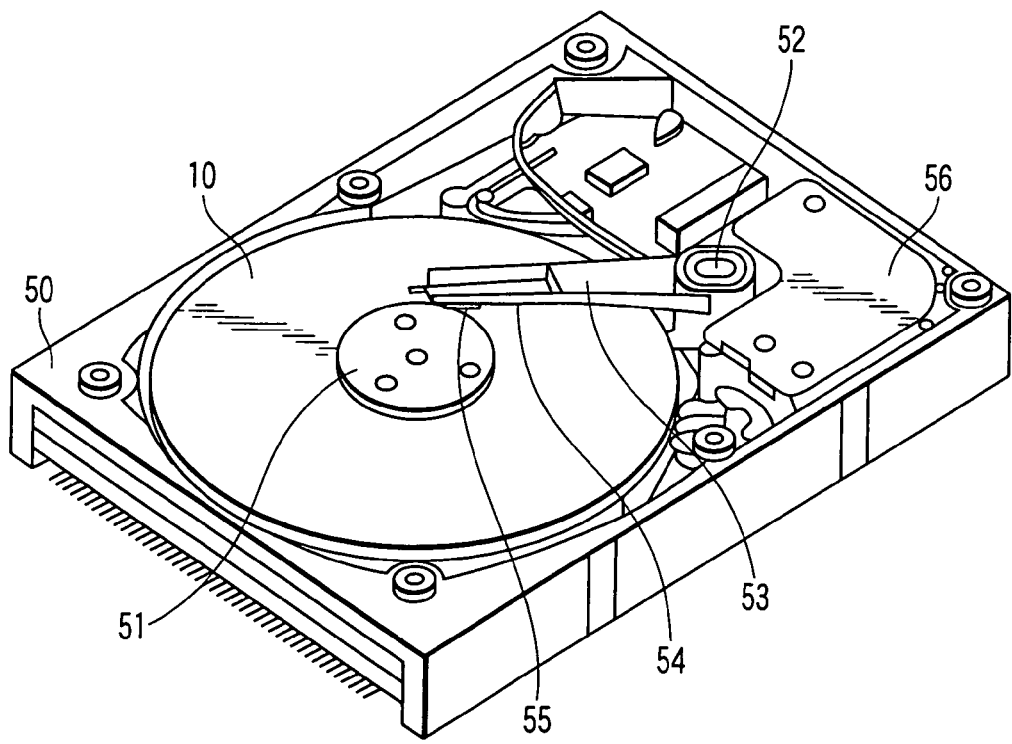
FIG. 5 is a perspective view of a magnetic recording apparatus according to an embodiment of the present invention.

FIG. 5 shows a perspective view of a magnetic recording apparatus according to an embodiment of the present invention. The magnetic recording apparatus comprises a magnetic recording media (DTR media) 10, a spindle motor 51 that rotates the DTR media 10, a head slider 55, a head suspension assembly (suspension 54 and actuator arm 53) that supports the head slider 55, a voice coil motor (VCM) 56, and a circuit board, which are arranged inside a housing 50. The DTR media 10 is mounted to the spindle motor 51 and rotated. A perpendicular recording scheme is used to record various digital data on the DTR media 10. The magnetic head incorporated in the head slider 55 is what is called a composite head comprising a single-pole head and a GMR element. The suspension 54 is held at one end of the actuator arm 53 to support the head slider 55 so that it faces the recording surface of the DTR media 10. The actuator arm 53 is attached to a pivot 52. A voice coil motor (VCM) 56 is provided at the other end of the actuator arm 53 to serve as an actuator. The voice coil motor (VCM) 56 drives the head suspension assembly to position the magnetic head over an arbitrary radial address on the DTR media 10. The circuit board comprises a head IC to generate driving signals for the voice coil motor (VCM), control signals that control read/write by the magnetic head, and the like.

A magnetic recording apparatus incorporating a magnetic recording media (DTR media) is produced. As media with patterns of protrusions and recesses in separating regions, three types of media are produced which have different values of the difference h1 in height (a–b in FIG. 1) between the top of the recording track and the top of the separating region and the difference h2 in height (a–c in FIG. 1) between the top of the recording track and the bottom of the separating region (Samples 1 to 3). For reference, conventional DTR media are also produced in which the separating region is made a recess does not have patterns of protrusions and recesses. Two types of conventional DTR media are produced which have different values of the difference h3 in height between the top of the recording track and the bottom of the separating region (Samples 4 and 5).

Table 1 shows the signal-to-noise ratios and flying stability of the magnetic recording apparatus incorporating each of the above media. For the signal-to-noise ratio, read/write (R/W) tests are conducted by a method of using the single-pole head to write signals to the magnetic recording media obtained and then using the GMR head to read the signals. Measurements are carried out at a fixed position, a radial position of 20 mm, by rotating the disk at 4,200 rpm. In the media signal-to-noise ratio (S/Nm), the S value is obtained at half the peak-to-peak value (positive and negative maximum values) in one magnetization reversal of a single waveform at 10 kFCI. The Nm value is the root mean square (rms) of noise at 400 kFCI. The media SNR decreases under the effect of noise from the adjacent tracks.

Table 1 indicates as follows. In Sample 2, the appropriate values are set for the difference h1 in height between the top of the recording track and the top of the separating region and the difference h2 in height between the top of the recording track and the bottom of the separating region, that is, 5 nm and 10 nm, respectively. Consequently, Sample 2 exhibits a high SNR and good flying stability of the head. Both heights h1 and h2 of Sample 1 are excessively small, so that the sample exhibits appropriate flying stability but a low SNR. Both h1 and h2 of Sample 3 are excessively large, so that the sample exhibits a high SNR but inappropriate flying stability. Sample 4 exhibits a low SNR though its recesses constituting the separating regions are deeper than the top of the separating region in Sample 2. The reason of this is believed that the flat separating regions in Sample 4 prevent the disturbance of the crystal orientation of the perpendicular magnetic recording film deposited on the separating regions, so that the magnetic recording film on the separating regions exhibits recording/reproducing characteristics comparable to those on the recording track, which lowers the SNR due to magnetic signals from the separating region. Sample 5 has an excessively large height h3 and thus exhibits a high SNR but inappropriate flying stability.

TABLE 1

| Sample No. | h1 (nm) | h2 (nm) | h3 (nm) | SNR (dB) | Flying stability |
|---|---|---|---|---|---|
| 1 | 1 | 7 | — | 20.4 | good |
| 2 | 5 | 10 | — | 25.3 | good |
| 3 | 10 | 30 | — | 24.9 | no good |
| 4 | — | — | 7 | 21.3 | good |
| 5 | — | — | 20 | 24.4 | no good |

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic recording media comprising:
    a substrate having recording tracks and separating regions separating adjacent recording tracks across a down-track direction, the separating regions having patterns of protrusions and recesses formed therein; and
    a recording film deposited on the substrate,
    wherein a difference in height between a top of the recording track and a top of the separating region is 2 nm or more and 7 nm or less, and a difference in height between the top of the recording track and a bottom of the separating region is 10 nm or more.

2. The magnetic recording media according to claim 1, wherein the difference in height between the top of the recording track and the bottom of the separating region is less than 30 nm.

3. The magnetic recording media according to claim 1, wherein the recording film has a multilayer structure including a soft underlayer and a perpendicular magnetic recording layer.

4. The magnetic recording media according to claim 1, wherein the patterns of protrusions and recesses in the separating region form linear patterns extending along the recording track.

5. The magnetic recording media according to claim 1, wherein the patterns of protrusions and recesses in the separating region form dot patterns.

6. A substrate for magnetic recording media comprising:
    regions corresponding to recording tracks; and
    separating regions that separate regions corresponding to adjacent recording tracks across a down-track direction, the separating regions having patterns of protrusions and recesses formed therein;
    wherein a difference in height between a top of the region corresponding to the recording track and a top of the separating region is 2 nm or more and 7 nm or less, and a difference in height between the top of the region corresponding to the recording track and a bottom of the separating region is 10 nm or more.

7. The substrate according to claim 6, wherein the difference in height between the top of the region corresponding to the recording track and the bottom of the separating region is less than 30 nm.

8. The substrate according to claim 6, wherein the patterns of protrusions and recesses in the separating region form linear patterns extending along the region corresponding to the recording track.

9. The substrate according to claim 6, wherein the patterns of protrusions and recesses in the separating region form dot patterns.

10. A magnetic recording apparatus comprising:
the magnetic recording media according to claim 1; and a magnetic head.

* * * * *